Sept. 8, 1936.  H. LIGHTBURN  2,053,484
DRIVING MECHANISM FOR ROTARY MACHINES
Filed July 10, 1935  3 Sheets-Sheet 2

INVENTOR
Herbert Lightburn
by his atty's
Byrnes, Stebbins & Blenko

Sept. 8, 1936.   H. LIGHTBURN   2,053,484
DRIVING MECHANISM FOR ROTARY MACHINES
Filed July 10, 1935   3 Sheets-Sheet 3

INVENTOR
Herbert Lightburn
by his atty's
Byrnes, Stebbins & Blenko

Patented Sept. 8, 1936

2,053,484

UNITED STATES PATENT OFFICE 2,053,484

DRIVING MECHANISM FOR ROTARY MACHINES

Herbert Lightburn, Nottingham, England, assignor to J. W. Lightburn & Son, Limited, Nottingham, England, a British company Application July 10, 1935, Serial No. 30,692
In Great Britain January 8, 1935

7 Claims. (Cl. 192—4)

This invention is for improvements in driving mechanism for rotary machines, such as washing machines for use in laundries, dyeing machines and the like, and relates to machines of that kind comprising a rotating cage containing the articles to be washed, rinsed or dyed. The driving mechanism drives the cage through a certain number of revolutions in one direction and then automatically drives it through the same number of revolutions in the opposite direction.

One object of the present invention is to ensure that the angle through which the cage rotates is the same for each direction so that the articles contained in the rotating cage do not become twisted up. Another object is the provision of means whereby the cage may be brought to rest at a convenient position for the insertion or removal of the contents. Yet another object of the invention is the provision of means whereby the cage may be brought to rest at its correct position, in an automatic manner.

The invention accordingly provides, in driving mechanism for rotary washing machines and the like, a driven shaft, two driving members mounted thereon and rotated in opposite directions, two clutch members mounted on said driven shaft and each adapted to connect one of said driving members to said shaft, a reciprocable clutch engaging member and striking mechanism continuously driven from one of the said driving members and connected to said clutch engaging element to reciprocate it. The connection between the striking mechanism and said clutch engaging element may be detachable so that the machine may be stopped by this means. In one form, the clutch engaging element is a slidable circular rod having a dog or other lateral projection to engage the striking mechanism whereby the rod is reciprocated and a hand lever is provided for rotating the rod whereby the said dog may be disconnected from the said striking mechanism.

The expression "striking mechanism" used herein denotes that part of the machine which automatically operates the clutch engaging element to alternately engage first one clutch and then the other. Any known mechanism for converting rotary into reciprocating motion may be used.

Other features of the invention will appear from the specific description of one embodiment thereof, which now follows.

In the drawings:—

Figure 5 is an enlarged sectional view of a detail of Figure 1;

Figure 6 is a section plan on the line 6—6 of Figure 5;

Figure 7 is a sectional elevation of the clutch mechanism of Figure 1; and

Figures 8 and 9 are detail views of the parts of the sliding block mechanism.

Figure 1:
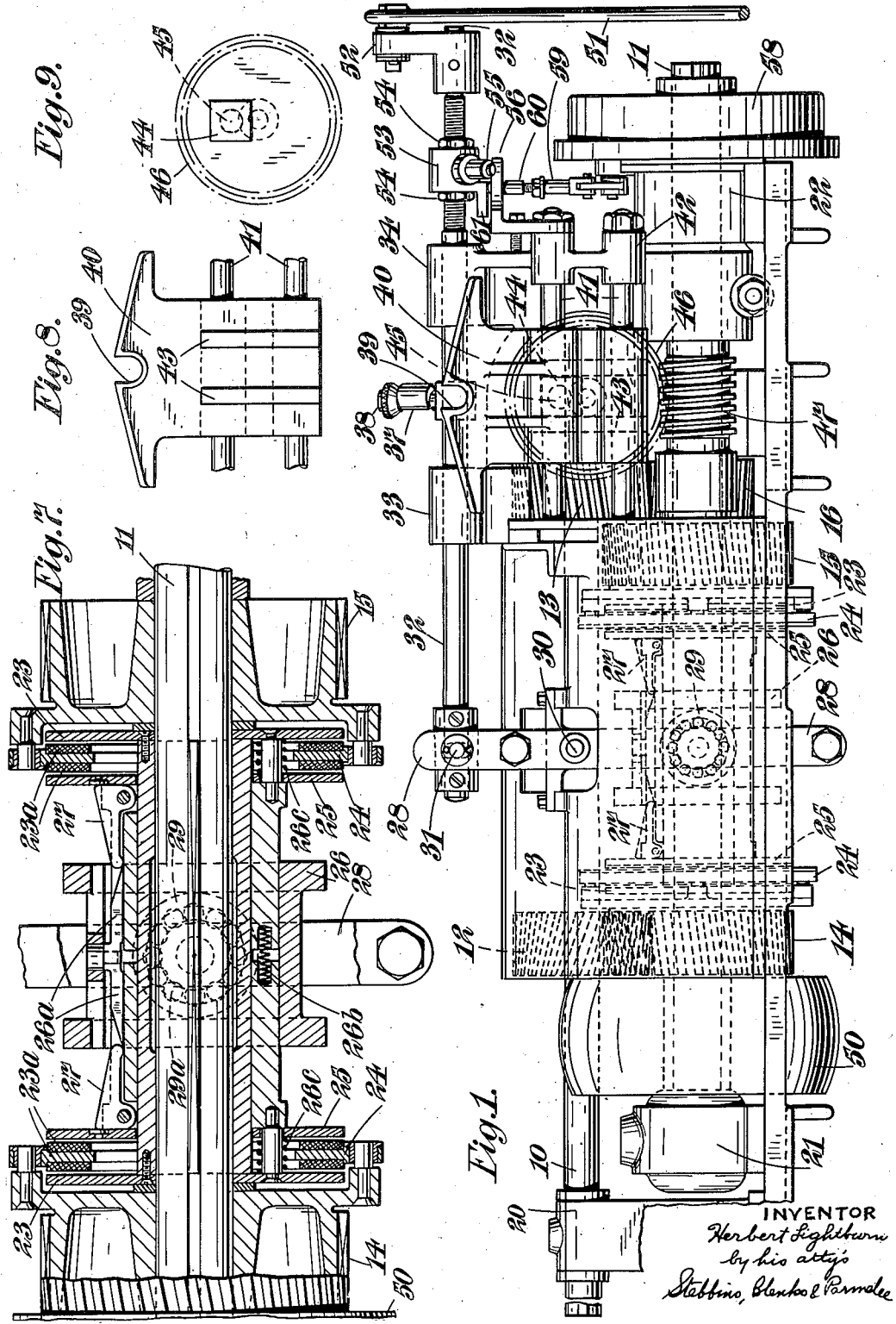
Figure 1 is a front outside elevation of driving mechanism according to the invention.
Figure 2:
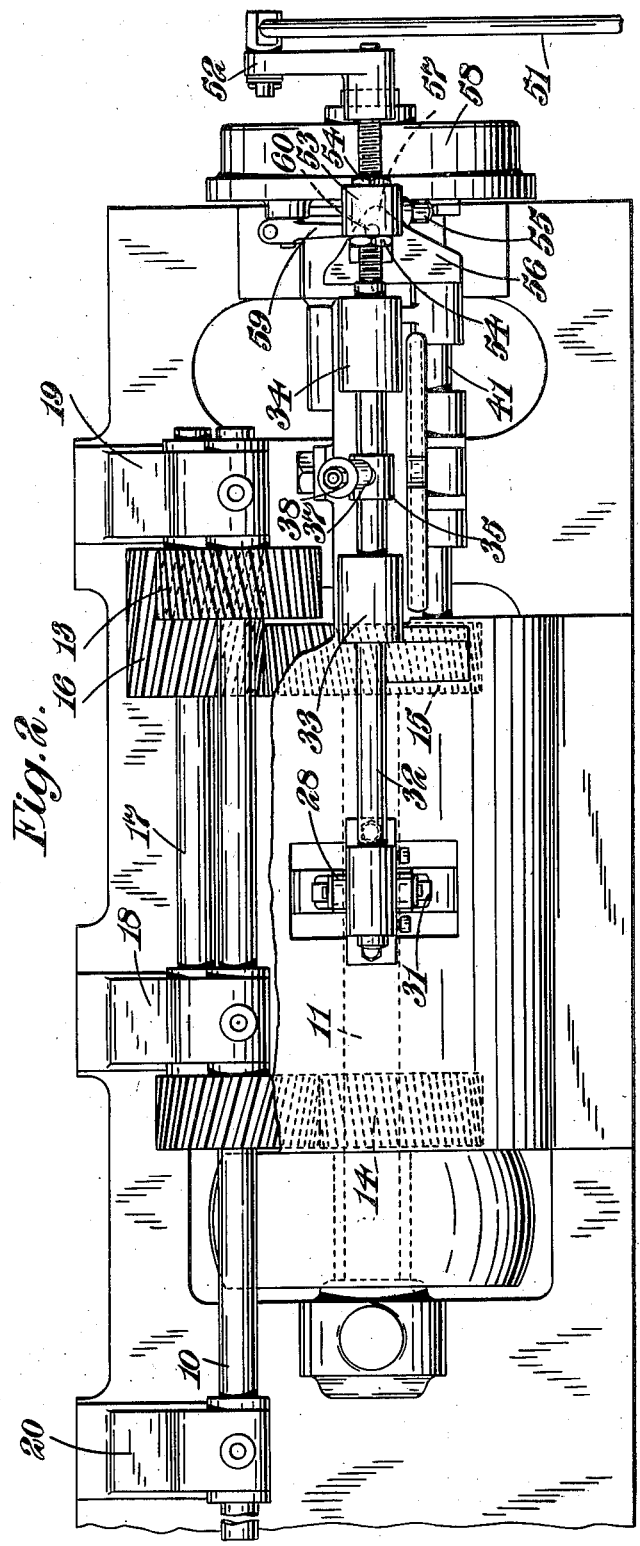
Figure 2 is a plan on Figure 1.
Figure 3:
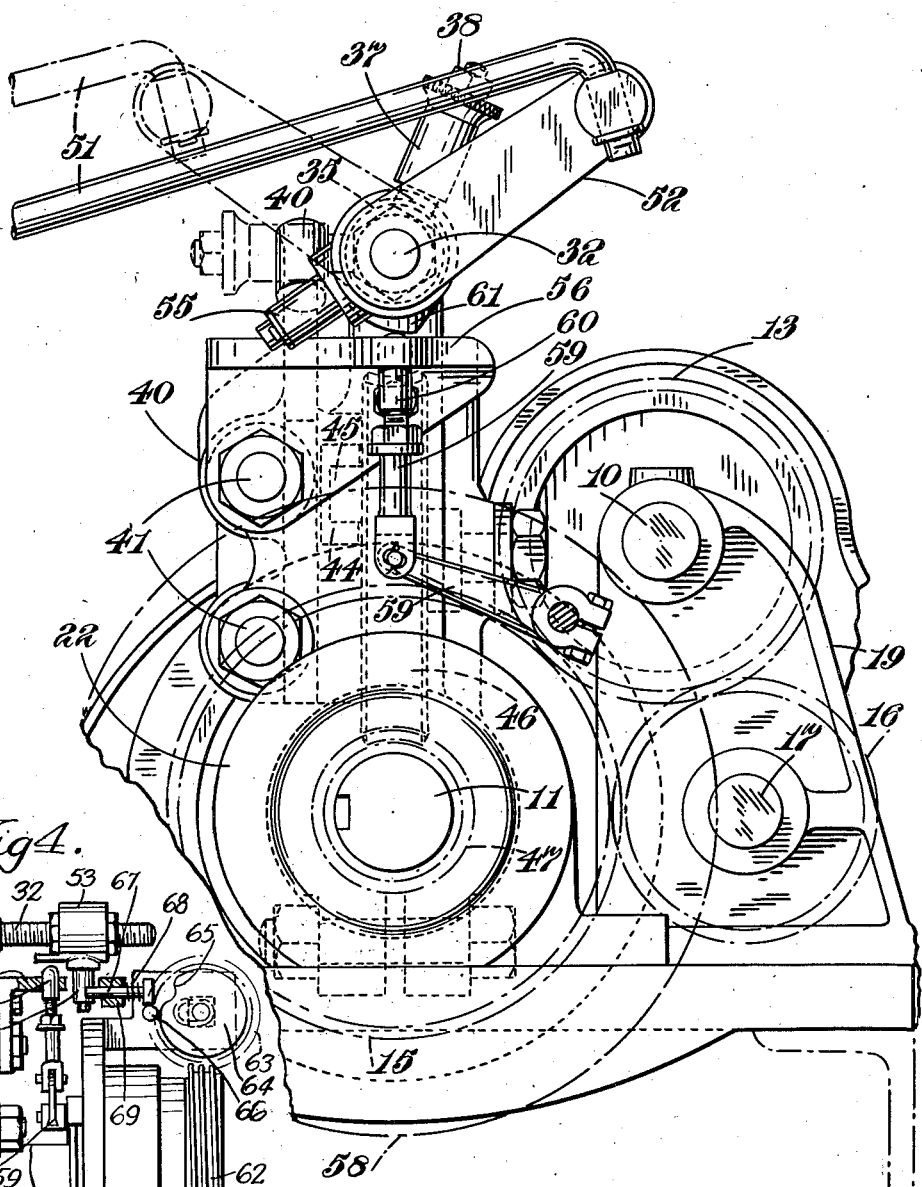
Figure 3 is an elevation at right angles to that of Figure 1.

As shown first in Figures 1, 2 and 3, the driving mechanism comprises essentially a back shaft 10, which is the driving shaft of the assembly, a cage-driving shaft 11 which is the driven shaft of the assembly, gears 12 and 13 mounted on the back shaft 10, gears 14 and 15 freely rotatable on the cage-driving shaft 11 and an intermediate gear 16 for transmitting the drive from the gear 13 to the gear 15. The intermediate gear 16 is carried on a lay shaft 17 borne in brackets 18 and 19. The back shaft 10 is borne in the brackets 19 and 20. The cage-driving shaft 11 is carried in bearings 21 and 22.

Each of the gears 14, 15 is associated with clutch mechanism which may be of any form known in the art. In the example shown in Figures 1 and 3, each clutch comprises a plate 23 solid with the shaft 11, an intermediate plate 24 slidable with respect to the appropriate gear 14, 15 but fixed against rotation with respect thereto, and a presser plate 25. The clutch comprises a central bobbin 26 having wedge members 26a to cooperate with pawls 27 in such a manner that when the bobbin is moved, for example, to the left as shown in Figure 1, the pawls 27 are rotated about their pivots, the presser plate 25 is slid along so as to grip the plate 24 between it and the plate 23 with the result that the appropriate gear 14 is clutched to the shaft 11. Suitable friction material 23a may be provided between the plates 23 and 24.

The longitudinal sliding of the bobbin 26 is effected by a strip metal stirrup 28 carrying rings 29 rotatable on ball bearings 29a and engaging the flange of the bobbin 26. The stirrup is mounted to rock about a bearing 30 on the frame of the machine and its upper end is slotted to receive a pin 31 on the end of a circular rod 32 journaled in bearings 33 and 34.

The rod 32 is provided with a boss 35 (see also Figures 5 and 6) to which is affixed a radial pin 36, the pin carrying an eccentric sleeve 37 rotatable on it. The sleeve can be locked in any desired angular position by means of a nut member 38 engaging the screw-threaded upper end of the pin 36. The purpose of the eccentricity of the sleeve 37 is explained below. The pin 36 with its sleeve 37 is adapted, on appropriate rotation of the shaft 32, to engage a slot 39 in a vertical plate 40 slidable from side to side on fixed guide rods 41 supported in a bracket 42 constituting part of the main frame of the mechanism. As shown in Figures 8 and 9, the plate 40 is formed with vertical ribs 43 which afford a guide-way for a square block 44 rotatable on a pin 45, which pin is mounted eccentrically on the face of a worm wheel 46 driven by a worm 47. The worm 47 is formed integrally with right hand clutch gear 15 so as to be driven by it.

It is convenient at this stage to describe the operation of the mechanism during normal running of the machine. The back shaft 10 is driven by a suitable prime mover such as an electric motor connected to its left hand end as seen in Figure 1. The gears 12 and 13 thus rotate in the same direction; the gear 14 therefore rotates in the opposite direction to the gear 12 but the gear 15 (by reason of the intermediate gear 16) rotates in the same direction as the gear 13. Thus, the gears 14 and 15 are continuously rotated in opposite directions to one another. With the parts in the position shown neither of the clutches is in engagement so that the shaft 11 is not connected to either of the gears 14 and 15.

Assuming now that the sleeve 37 on the pin 36 is resting in the slot 39 on the plate 40 (i. e. the position shown in dotted lines in Figure 3), the worm 47 will rotate the worm wheel 46 so as to move the plate 40 slightly to one side of this mean position. For example, the plate will begin to move to the left. This movement will be transferred to the rod 32 and from thence to the stirrup 28 until the clutch associated with the gear 14 is engaged. The effect of this is that the shaft 11 is driven as one with the gear 14. The drive from the shaft 11 to the washing cage may be transmitted by means of a belt passing round the pulley 50 which is keyed to the shaft 11. The striking mechanism completes its stroke to the left and then moves to the right, back into the position shown in Figure 1 whereupon the left hand clutch is disengaged. Continued movement to the right engages the right hand clutch associated with the gear 15 with the result that the washing cage is now driven in the reverse direction. It will be understood that when one of the clutches is engaged the gear 14 or 15 associated with the other clutch rotates idly on the shaft 11. The worm 47 is part of a tubular shaft surrounding the shaft 11 and is driven continuously in the same direction through the gears 13, 16, 15.

In a rotary washing machine of the kind with which the present invention is concerned, it is important that the number of degrees through which the cage rotates in one direction should be almost exactly equal to the number of degrees rotated in the other direction, even when the actual rotation is a matter of a large number of complete revolutions. If this condition is not obtained, articles, such as garments in the cage tend to become twisted and knotted, an effect known as "roping", by the cumulative discrepancy between the two angles of rotation. In order to avoid roping, means are provided in the machine by the present invention for adjusting the mean position of the stirrup 28 with respect to that of the striking plate 40 such that each clutch gives the same angle of revolution. This means is shown in the drawings as the simple sleeve 37 eccentrically mounted on the pin 36. It will be seen that by rotating the sleeve 37 and re-tightening the nut 38 the operator can vary the effective centre line of the projecting pin and thereby adjust the mean position of the stirrup 28. If desired, the sleeve may be provided with an index whereby its setting at any time may be read off.

When it is required to stop the machine the operator pushes on the rod 51 which is connected to a lever 52 and thereby rotates the rod 32 bringing the sleeve 37 out of engagement with the slot 39 in the striking plate 40. According to the invention special means are provided whereby the operator may effect delicate adjustment of the final position of the cage, an operation known as "inching". Such means will now be described and comprises a boss 53 affixed to the rod 32 by means of nuts 54 and having a radially projecting roller 55 which cooperates with the edge of a fixed cam-shaped plate 56. The cam has a crest 57 and it will be seen from Figure 3 that it is necessary for the roller 55 to pass over this crest in the movement of the sleeve 37 from its extreme forward position in engagement with the slot 39 to its extreme rearward position shown in Figure 3.

Inching is effected as follows. Assuming the sleeve 37 to be lying in the slot 39, the operator pushes on the rod 51 until the sleeve is just clear of the slot. Springs 26b and 26c provided in the clutch mechanism tend to centre the stirrup 28 and the washing cage eventually comes to rest. Usually the cage will not be in the correct position for opening the outer doors of the machine and the operator therefore cautiously applies further movement to the rod 51, causing the roller 55 to travel towards the crest 57 of the cam 56. Such travel, by virtue of the shape of the cam, is necessarily accompanied by longitudinal movement of the rod 32 so that the right hand clutch is temporarily re-engaged and the washing cage set in motion again. The total height of the crest 57 of the cam is less than that corresponding to the position of full engagement of the right hand clutch so that the clutch is engaged only lightly during the inching operation. When the washing cage has been inched round to the correct position, the operator gives a quick full throw to the rod 51 so that the roller 55 quickly passes over the crest 57 and reaches a position such as is shown in Figure 2.

Another important desideratum is that the washing cage should be locked against movement when the outer doors of the machine are open. This is effected, according to the invention, by means of a brake drum 58 cooperating with brake mechanism carried on the right hand end of the shaft 11. The brake actuating linkage 59 is operated by a plunger 60 extending through a hole in the cam plate 56 and is normally spring pressed upwardly to hold the brake "off". However, on the completion of the backward throw of the lever 52 a wedge shaped cam 61 carried by the boss 53 is brought down on to the plunger 60 as clearly shown in Figure 3 with the result that the brake is applied to the shaft 11 and the washing cage locked against further rotation.

Figure 4:
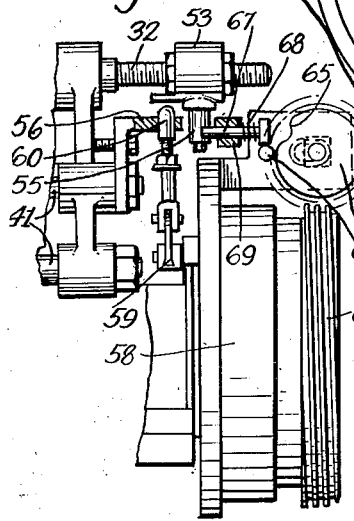
Figure 4 is a view, corresponding to the elevation of Figure 1, of a modified form of the invention.

The inching arrangement discussed above may in some cases be dispensed with and an alternative arrangement is accordingly shown in Fig. 4 in which a worm 62 of large diameter is formed integrally with the tubular shaft carrying the worm 47 and connected to the gear 15. The worm 42 drives a smaller worm wheel 63 which carries a cam 64 mounted concentrically with it. The cam 64 is of constant radius except for a solitary depression 65 and the cam edge cooperates with a follower 66 mounted on a laterally sliding plunger 67 normally pressed towards the right by means of a spring 68. The plunger 67 is guided in a sleeve 69 and its left hand end projects partially across a gap between the sleeve 69 and the cam 56 so as to obstruct the passage of the member 55 through the gap. The gear ratio of the gearing 62, 64 is such that the depression 65 in the cam 64 comes opposite the follower 66 every time the washing cage is in its correct position for stopping. If now, the operator pushes on the rod 51 to stop the machine the plunger 67 prevents the sleeve 37 from being disengaged unless and until the washing cage is in its proper position. When this position is reached, the depression 65 permits the spring 68 to retract the plunger 67 with the result that the member 55 is free to pass through the gap and the machine can be stopped. The whole operation occupies only a short time. The operator grasps a handle on the rod 51 and pushes, maintaining the pressure until the rod 32 rotates and the machine stops.

I claim:—

1. Driving mechanism for rotary machines, comprising a driven shaft, two driving members mounted thereon and rotated in opposite directions, two clutch members mounted on said driven shaft and each adapted to connect one of said driving members to said shaft, a reciprocable and rotatable clutch-engaging rod, striking mechanism continuously driven from one of the said driving members, a projection on the said rod adapted to be engaged by the striking mechanism for reciprocating the rod and a hand lever connected to said rod for rotating it, whereby the said projection may be disconnected from the said striking mechanism.

2. Driving mechanism for rotary machines, comprising a driven shaft, two driving members mounted thereon and rotated in opposite directions, two clutch members mounted on said driven shaft and each adapted to connect one of said driving members to said shaft, a reciprocable and rotatable clutch-engaging rod, striking mechanism continuously driven from one of the said driving members, a projection on the said rod adapted to be engaged by the striking mechanism for reciprocating the rod, a hand lever connected to said rod for rotating it, whereby the said projection may be disconnected from the said striking mechanism, an additional projection on the rod and a stationary cam member cooperating therewith in such manner that rotation of the rod beyond the point of disconnection of the first projection from the striking mechanism causes endwise movement of the rod and consequent partial actuation of one of the clutch members.

3. Driving mechanism for rotary washing machines, comprising a driven shaft, a brake associated therewith, two driving members mounted thereon and rotated in opposite directions, two clutch members mounted on said driven shaft and each adapted to connect one of said driving members to said shaft, a reciprocable clutch-engaging element, striking mechanism continuously driven from one of the said driving members and connected to said clutch-engaging element to reciprocate it, and a hand lever operable to disengage the said clutch engaging element from the striking mechanism and also to apply the brake to the said driven shaft.

4. Driving mechanism for rotary washing and like machines, comprising a driven shaft, a brake associated therewith, two driving members mounted thereon and rotated in opposite directions, two clutch members mounted on said driven shaft and each adapted to connect one of said driving members to said shaft, a reciprocable clutch-engaging element, striking mechanism continuously driven from one of the said driving members, a detachable connection between said striking mechanism and said clutch-engaging element and a hand lever operable to destroy said connection and also to apply the brake to said driven shaft.

5. Driving mechanism for rotary washing and like machines comprising a driven shaft, two driving members mounted thereon and rotated in opposite directions, two clutch members on said driven shaft each adapted to connect one of said driving members to said shaft, a reciprocable and rotatable clutch-engaging rod, striking mechanism continuously driven from one of the said driving members and a radially projecting pin on said rod having borne upon it an eccentrically mounted sleeve adapted to be engaged by the striking mechanism for reciprocating the rod.

6. Driving mechanism for rotary washing and like machines comprising a driven shaft, two driving members mounted thereon, two clutch members mounted on said driven shaft and each adapted to connect one of said driving members to said driven shaft, a reciprocable clutch-engaging element, continuously driven striking mechanism connected to said clutch-engaging element to reciprocate it and means driven from the driven shaft to prevent disconnection of the clutch-engaging member from the striking mechanism except when the driven shaft is in a certain predetermined angular position.

7. Driving mechanism for rotary washing and like machines comprising a driven shaft, two driven members mounted thereon and rotated in opposite directions, two clutch members each adapted to connect one of said driving members to said shaft, a worm connected to one of said driving members and operable to drive striking mechanism connected to a clutch-engaging element to reciprocate it, a second worm also connected to the said driving member and engaging with a worm wheel having a cam member adapted to lock the said clutch engaging element against disconnection from the said striking mechanism except when the said driven shaft is in a predetermined angular position.

HERBERT LIGHTBURN.